United States Patent
Tu

(10) Patent No.: US 8,396,140 B2
(45) Date of Patent: Mar. 12, 2013

(54) METHOD, SYSTEM, AND DEVICE FOR POWER OPTIMIZATION BASED ON DIGITAL SUBSCRIBER LINE

(75) Inventor: Jianping Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 13/028,679

(22) Filed: Feb. 16, 2011

(65) Prior Publication Data

US 2011/0135017 A1 Jun. 9, 2011

Related U.S. Application Data

(63) Continuation of application No. PCT/CN2009/071378, filed on Apr. 21, 2009.

(30) Foreign Application Priority Data

Aug. 18, 2008 (CN) .......................... 2008 1 0145881

(51) Int. Cl.
*H04L 27/00* (2006.01)
(52) U.S. Cl. ........ 375/259; 375/316; 375/260; 375/295; 375/285; 375/224; 375/225; 375/219; 375/221
(58) Field of Classification Search .................. 375/316, 375/260, 295, 285, 224, 225, 219, 221
See application file for complete search history.

(56) References Cited

U.S. PATENT DOCUMENTS

| 6,084,917 | A | 7/2000 | Kao et al. | |
|---|---|---|---|---|
| 7,133,419 | B1 * | 11/2006 | Hendrichs et al. | ............ 370/468 |
| 7,852,952 | B2 * | 12/2010 | Rhee et al. | .................... 375/260 |
| 7,864,697 | B2 * | 1/2011 | Papandriopoulos et al. | . 370/252 |
| 7,885,352 | B2 * | 2/2011 | Yuan et al. | ..................... 375/296 |

(Continued)

FOREIGN PATENT DOCUMENTS

| CN | 1852038 A | 10/2006 |
|---|---|---|
| CN | 1852396 A | 10/2006 |

(Continued)

OTHER PUBLICATIONS

Extended European Search Report dated (mailed) Dec. 19, 2011, issued in related Application No. 09807824.9-2411, PCT/CN2009071378, Hauwei Technologies Co., Ltd.

(Continued)

*Primary Examiner* — Siu Lee
(74) *Attorney, Agent, or Firm* — Leydig, Voit & Mayer, Ltd.

(57) ABSTRACT

A method, system, and device for power optimization based on Digital Subscriber Line (DSL) are provided. The method includes the following steps. Service information of a subscriber is collected, and physical layer target parameters are obtained according to Quality of Experience (QoE) parameters corresponding to the service information. Line running information of the subscriber is received. The physical layer target parameters and the line running information are used as input parameters of a power optimization algorithm, and an optimized power spectrum is obtained through the power optimization algorithm. Therefore, a DSL network is optimized according to the QoE, and subscriber's experience is improved. Moreover, a least power method is adopted to optimize a transmit power spectrum, and the total power consumption and crosstalk between different DSL signals are reduced while meeting the QoE, so that the signal transmission of the system is stable, and the service transmission quality is improved.

15 Claims, 11 Drawing Sheets

U.S. PATENT DOCUMENTS

| | | | |
|---|---|---|---|
| 8,009,749 B2 * | 8/2011 | Schenk | 375/260 |
| 2002/0137467 A1 | 9/2002 | Tzannes | |
| 2005/0089043 A1 | 4/2005 | Seckin et al. | |
| 2005/0123027 A1 | 6/2005 | Cioffi | |
| 2006/0189340 A1 | 8/2006 | Sung et al. | |
| 2007/0274404 A1 * | 11/2007 | Papandriopoulos et al. | 375/260 |
| 2007/0299746 A1 | 12/2007 | Haley et al. | |
| 2008/0039097 A1 | 2/2008 | Sathyanarayan | |

FOREIGN PATENT DOCUMENTS

| | | |
|---|---|---|
| CN | 1961530 A | 5/2007 |
| CN | 1976440 A | 6/2007 |
| CN | 101166046 A | 4/2008 |
| CN | 101345552 A | 1/2009 |
| EP | 0869647 A2 | 10/1998 |
| EP | 2259495 A1 | 12/2010 |
| WO | WO 99/20027 | 4/1999 |
| WO | WO 00/54473 A1 | 9/2000 |
| WO | WO 2005/022852 A1 | 3/2005 |

OTHER PUBLICATIONS

Written Opinion of the International Searching Authority (translation) dated (mailed) Jul. 30, 2009, issued in related Application No. PCT/CN2009/071378, filed Apr. 21, 2009, Huawei Technologies Co., Ltd.

International Search Report from P.R. China in International Application No. PCT/CN2009/071378 mailed Jul. 30, 2009.

ITU-T, "Series G: Transmission Systems and Media, Digital Systems and Networks, Digital sectiosn and digital line system—Access networks", Very high speed digital subscriber line transceivers 2 (VDSL2), G.993.2, pp. i-v and 1-242, (Feb. 2006).

Second Chinese Office Action dated May 18, 2012, issued in related Chinese Application No. 200810145881.0.

3$^{rd}$ Office Action in corresponding Chinese Patent Application No. 200810145881.0 (Oct. 19, 2012).

\* cited by examiner

METHOD, SYSTEM, AND DEVICE FOR POWER OPTIMIZATION BASED ON DIGITAL SUBSCRIBER LINE

CROSS-REFERENCE TO RELATED APPLICATIONS

This application is a continuation of International Application No. PCT/CN2009/071378, filed on Apr. 21, 2009, which claims priority to Chinese Patent Application No. 200810145881.0, filed on Aug. 18, 2008, both of which are hereby incorporated by reference in their entireties.

FIELD OF THE TECHNOLOGY

The present invention relates to the field of communication technology, and more particularly to a method, system, and device for power optimization based on Digital Subscriber Line (DSL).

BACKGROUND OF THE INVENTION

The DSL technology is a technology for data high-speed transmission via an Unshielded Twist Pair (UTP), which includes an Asymmetrical Digital Subscriber Line (ADSL), a Very-high-bit-rate Digital Subscriber Line (VDSL), an Integrated Services Digital Network Digital Subscriber Line (IDSL), a Single-pair High-bit-rate Digital Subscriber Line (SHDSL), and so on.

In various DSL technologies, in addition to the IDSL and SHDSL which transmit services via a baseband, other DSLs usually use a passband to transmit services, that is, frequency division multiplexing technology is adopted to transmit a DSL service and a Plain Old Telephone Service (POTS) on a single UTP. The DSL service is transmitted in the high frequency band, and a Discrete Multi-Tone Modulation (DMT) is adopted to modulate and demodulate the service signals, while the POTS is transmitted in a baseband section. The signals of the above two services are processed uniformly through a splitter/integrator.

In an access system where the DSL service and the POTS service coexist, the accessed DSL service may have multi-paths. At a central office and a user end, the multi-path DSL service signals and POTS service signals are processed through a DSL Access Multiplexer (DSLAM), as is shown in FIG. 1, which is a schematic structural view of an access system. The user end DSLAM 120 includes a user end transceiver unit 121 and a splitter/integrator 122. In an uplink direction, the user end transceiver unit 121 receives multi-path DSL information from a computer 110 and amplifies the received signals, and then sends the amplified multi-path DSL signals to the splitter/integrator 122. The splitter/integrator 122 integrates the multi-path DSL signals from the user end transceiver unit 121 and the POTS signals from a telephone terminal 130. The integrated signals are then transmitted through multi-path UTPs 140 and are received by a splitter/integrator 151 of the central office DSLAM 150. The splitter/integrator 151 splits the received signals, sends the POTS signals to a public switched telephone network (PSTN) 160, and sends the multi-path DSL signals to a central office transceiver unit 152. The central office transceiver unit 152 re-amplifies the received multi-path DSL signals, and sends the amplified signals to a network management system 170. In the downlink direction, the process of signal transmission is identical to that in the uplink direction, and will not be described herein again.

As different types of DSL services may be transmitted on each UTP, the different types of DSL signals may interfere with each other. In the prior art, the signals are modulated by using the DMT technology of frequency division multiplexing. Meeting the data rate of K−1 subscribers, the method maximizes the rate of the remaining subscriber, and satisfies a power constraint $$\sum_{k=1}^{K} S_k^n \le P_n,$$

in which $P_k$ represents the maximum total power that can be sent by the subscriber k, and $S_n^{k,max}$ represents the maximum total power that can be sent by the $n^{th}$ tone of the subscriber k.

In the research of the prior art, the inventor found that maximization of a line rate can meet the subscriber's requirement for the rate; however, with the emergence of a VOIP service and an IPTV service that have a high requirement for line quality, only meeting the requirement for the line rate may result in a decline in the line quality, such as voice delay and frame loss. Due to the unstable line running quality, the subscriber's experience is affected. Moreover, since the subscriber does not need a very high rate in most cases, the power in the system is wasted by adopting the method of maximizing the line rate, resulting in increase of crosstalk between the lines as well as the cost of the system.

SUMMARY OF THE INVENTION

The present invention is directed to a method, system, and device for power optimization based on DSL, so as to reduce the power consumption of the system and the crosstalk between the lines while meeting the subscriber's Quality of Experience (QoE).

In order to achieve the above objective, the present invention provides the following technical solutions.

A method for power optimization based on DSL is provided, which includes the following steps.

Service information of a subscriber is collected, and physical layer target parameters are obtained according to QoE parameters corresponding to the service information.

Line running information of the subscriber is received.

The physical layer target parameters and the line running information are used as input parameters of a power optimization algorithm, and an optimized power spectrum is obtained through the power optimization algorithm.

A system for power optimization based on DSL is provided, which includes a network management device and a central office device.

The network management device is adapted to collect service information of a subscriber, obtain physical layer target parameters according to QoE parameters corresponding to the service information, receive line running information of the subscriber reported by the central office device, use the physical layer target parameters and the line running information as input parameters of a power optimization algorithm, and obtain an optimized power spectrum through the power optimization algorithm.

A device for power optimization based on DSL is provided, which includes a physical layer parameter acquiring unit, a line running information receiving unit, and an optimized power spectrum acquiring unit.

The physical layer parameter acquiring unit is adapted to collect service information of a subscriber, and obtain physical layer target parameters according to QoE parameters corresponding to the service information.

The line running information receiving unit is adapted to receive the line running information of the subscriber.

The optimized power spectrum acquiring unit is adapted to use the physical layer target parameters and the line running information as input parameters of a power optimization algorithm, and obtain an optimized power spectrum through the power optimization algorithm.

As can be seen in the technical solutions of the present invention, service information of a subscriber is collected, physical layer target parameters are obtained according to QoE parameters corresponding to the service information, line running information of the subscriber is received, and an optimized power spectrum is obtained through the power optimization algorithm. Different from common power spectra, the power spectrum is a power spectrum that best matches with the physical layer target parameters. The embodiments of the present invention are applied for DSL parameter optimization, and since the DSL network is optimized according to the QoE, the subscriber's experience is improved. Moreover, a least power method is adopted to optimize a transmit power spectrum, and the total power consumption and crosstalk between different DSL signals are reduced while meeting the QoE, so that the signal transmission of the system is stable, and the service transmission quality is improved.

DETAILED DESCRIPTION OF THE EMBODIMENTS

In the embodiments, the present invention provides a method, system, and device for power optimization based on DSL. The method includes the following steps. Service information of a subscriber is collected, and physical layer target parameters are obtained according to QoE parameters corresponding to the service information. Line running information of the subscriber is received. The physical layer target parameters and the line running information are used as input parameters of a power optimization algorithm, and an optimized power spectrum is obtained through the power optimization algorithm.

In the DSL technology, the method of obtaining a maximum rate is difficult for optimizing and improving the DSL network condition, that is, difficult for improving performance indexes such as bit error rate (BER) and dropping rate, and thus the subscriber's experience is not good. In order to improve the subscriber's QoE, the DSL network is optimized according to the QoE in the embodiments of the present invention. When a sent power spectrum is optimized through a Dynamic Spectrum Management (DSM) algorithm, encoding parameters are optimized simultaneously according to different service types, so as to meet the QoE to the greatest degree.

Figure 1:
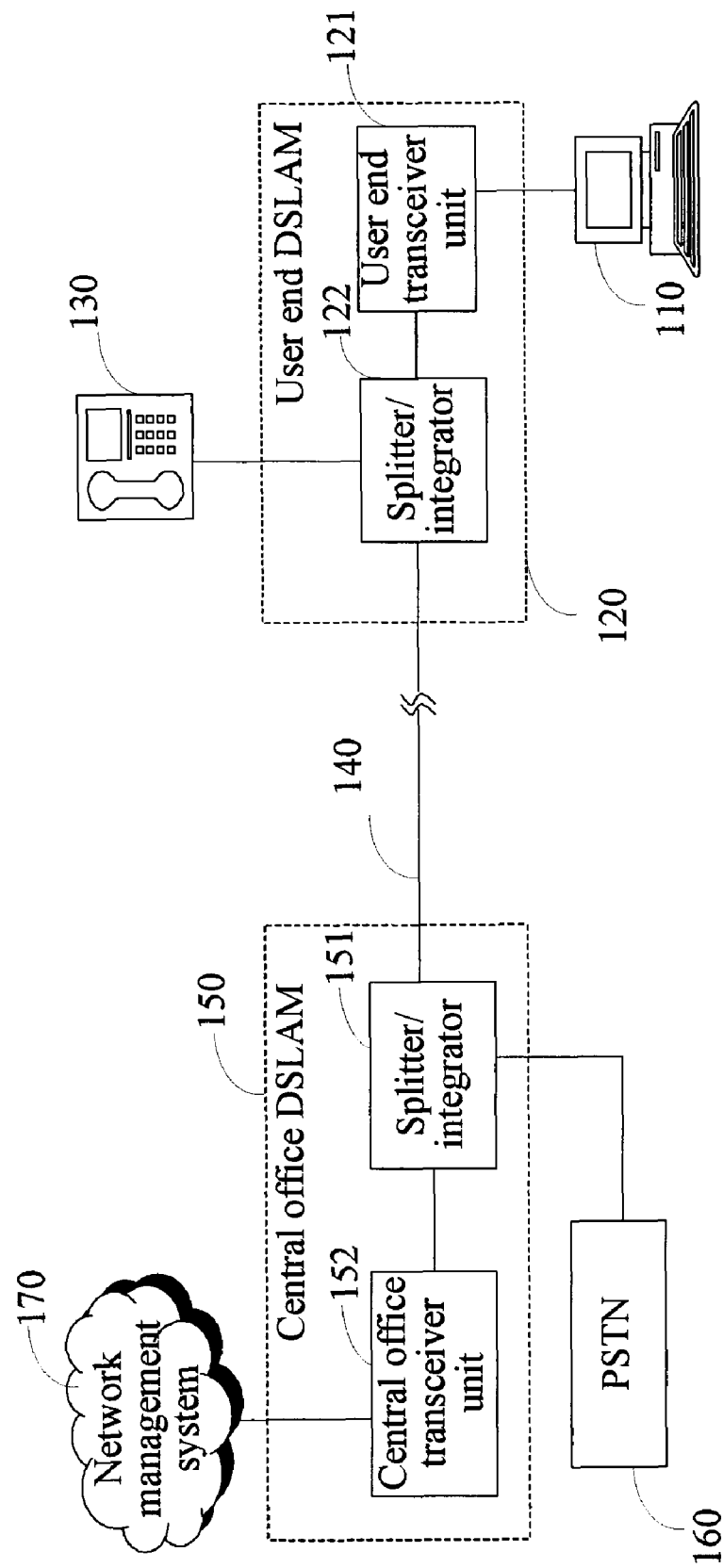
FIG. 1 is a schematic structural view of an existing xDSL system.
Figure 2:
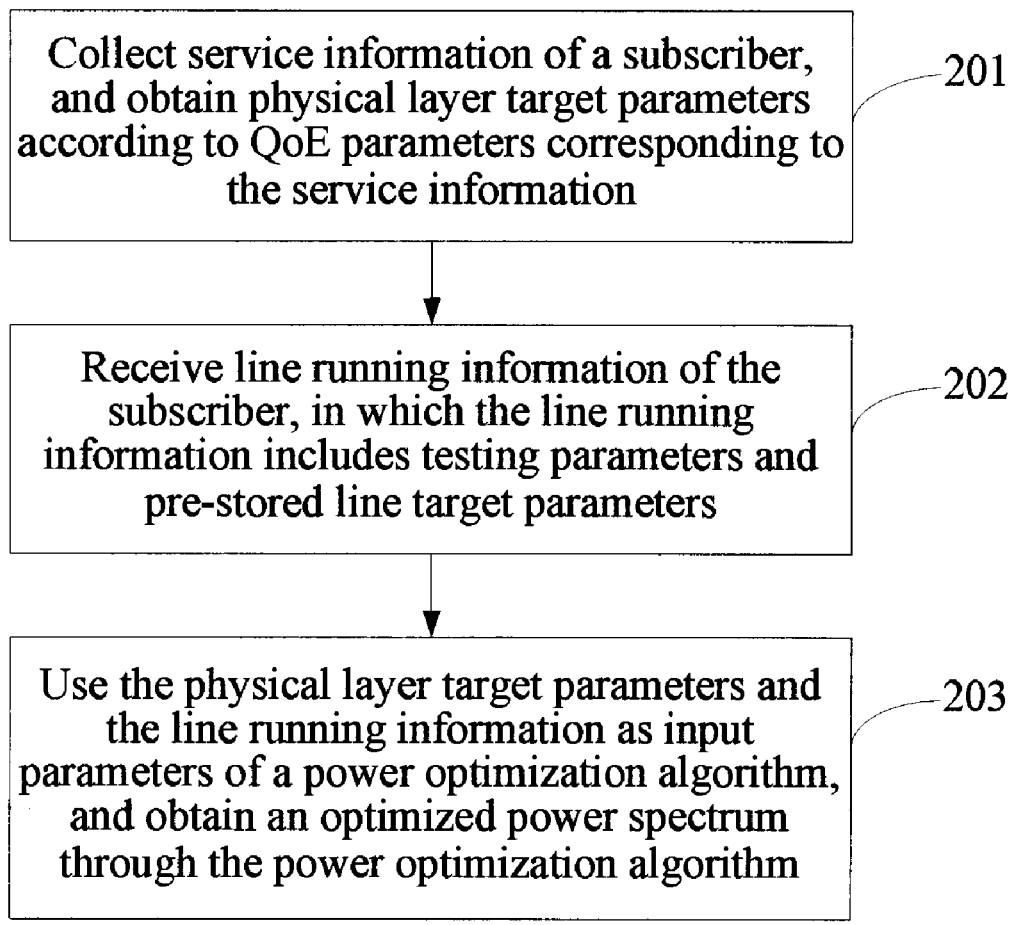
FIG. 2 is a flow chart of an embodiment of a method for power optimization based on DSL according to the present invention.

A flow of an embodiment of a method for power optimization based on DSL according to the present invention is as shown in FIG. 2.

In Step 201, service information of a subscriber is collected, and physical layer target parameters are obtained according to QoE parameters corresponding to the service information.

When the service information of the subscriber is collected, the service information of the subscriber delivered at a preset time interval is received; or a request for obtaining the service information of the subscriber is sent, and the service information of the subscriber returned according to the request is received.

Specifically, when the physical layer target parameters are obtained, a pre-stored corresponding relation between the service types and the QoE parameters is searched to obtain the QoE parameters corresponding to the service information, the QoE parameters that are of a same type but are of different services are compared to obtain the QoE parameter with a maximum value, and all the QoE parameters with the maximum value are converted into physical layer target parameters according to a corresponding relation between the QoE parameters and the physical layer target parameters.

The QoE parameters include an end-to-end network delay, a jitter parameter, a maximum error duration, a number of IP packet loss, an error packet loss time interval, an IP layer net rate, an IP packet loss rate, and an IP BER. The physical layer target parameters include a minimum net rate, a minimum INP, a maximum delay, and a target signal-to-noise ratio (SNR) margin.

In Step 202, line running information of the subscriber is received, and the line running information includes testing parameters and pre-stored line target parameters.

The receiving the line running information of the subscriber may be implemented as follows. The line running information of the subscriber reported by a central office device at a preset time interval is received; or a request for sending the line running information of the subscriber is sent to the central office device, in which the request includes an identification of the subscriber, and the line running information of the subscriber returned by the central office is received.

The testing parameters include background noise and channel attenuation. The pre-stored line target parameters include a maximum reachable rate, a maximum power, and a maximum power of each sub-band.

In Step 203, the physical layer target parameters and the line running information are used as input parameters of a power optimization algorithm, and an optimized power spectrum is obtained through the power optimization algorithm.

Figure 3:
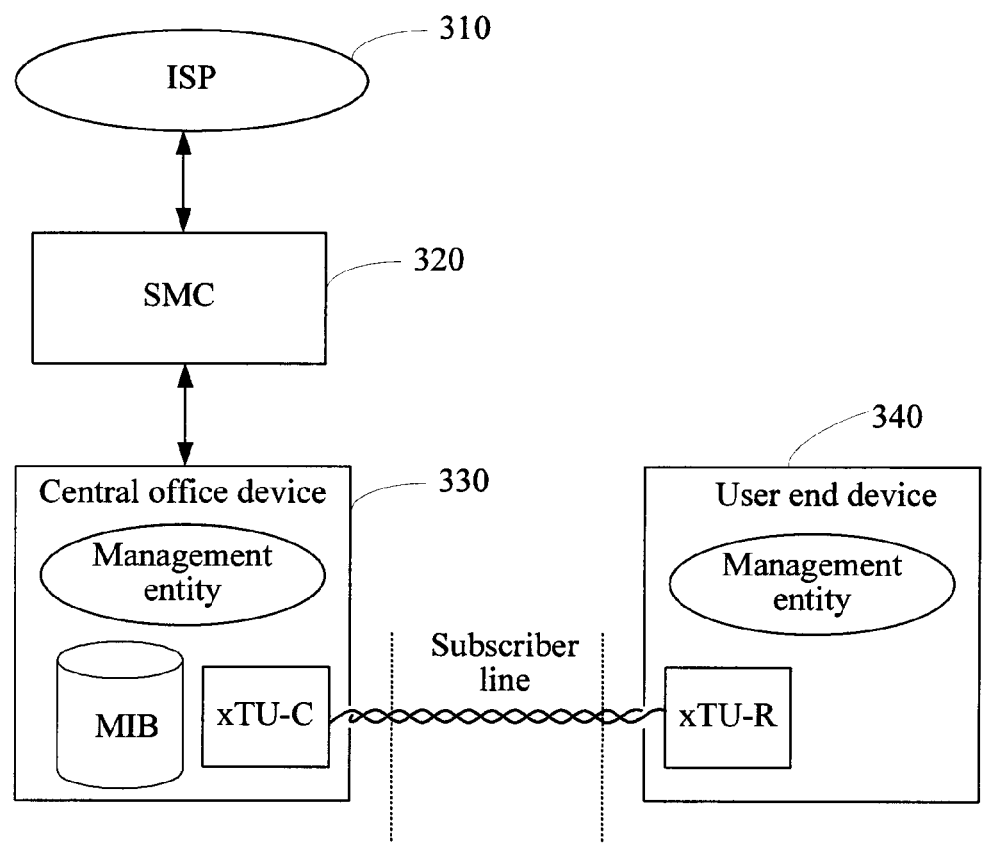
FIG. 3 is a schematic structural view of an application of the embodiment of the method for power optimization according to the present invention.

An embodiment of a method for power optimization based on DSL according to the present invention is commonly applied in the schematic structural view of FIG. 3. Firstly, a Spectrum Management Center (SMC) 320 collects service information opened in each subscriber line from an Information Service Provider (ISP) 310. The SMC 320 stores QoE parameters corresponding to different services. After obtaining the QoE parameters corresponding to each service according to the collected service information, the SMC 320 analyzes the QoE parameters into various target parameter values of the physical layer. Then, the SMC 320 collects running parameters at ports of each subscriber line from a Management Information Base (MIB) via a management entity (such as a DSLAM device) in a central office device 330, in which the running parameters include a service transmission type, a target line rate, a target SNR margin, and so on. The background noise, channel attenuation, and crosstalk channel of the line are obtained by testing. A conversion between the minimum net rate and the line rate is performed according to a relation between the minimum net rate, the minimum impulse noise protection (INP), the maximum delay, and the line rate. The line rate, the target SNR margin, and the line running parameter are optimized through the power optimization algorithm, and power spectrum parameters are output. Finally, the SMC 320 generates a QoE template with the optimized power spectrum parameters and the physical layer target parameters. The QoE template is delivered to each corresponding subscriber line via the management entity. When the line is activated, a sending unit xTU-C of the central office device 330 and a sending unit xTU-R of the user end device 340 execute these parameter configurations, and the power optimization becomes effective.

The process of power optimization by applying an embodiment of a method of the present invention will be described in detail with reference to FIG. 3.

Figure 4A:
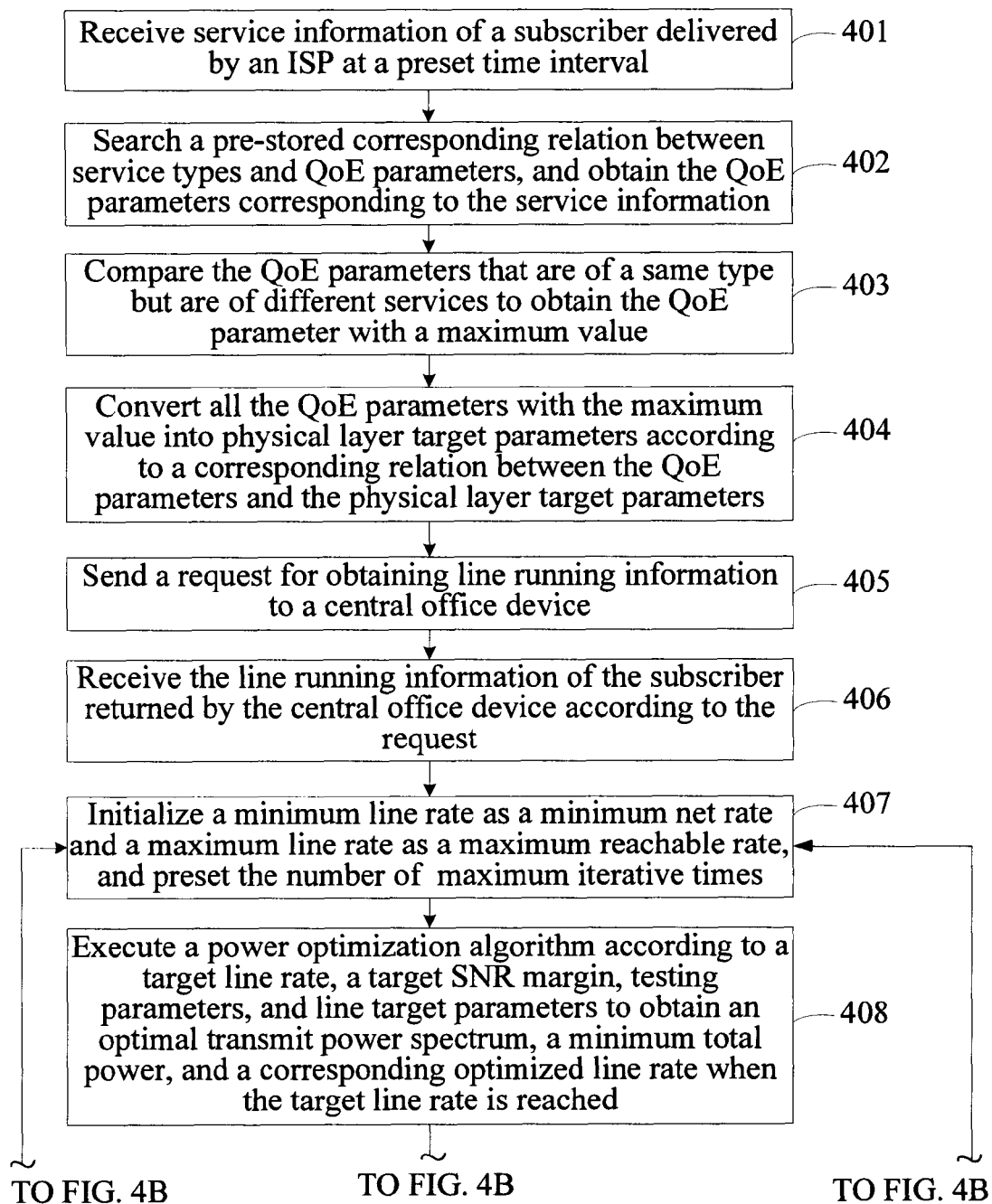
FIGS. 4A and 4B are a flow chart of another embodiment of a method for power optimization based on DSL according to the present invention.
Figure 4B:
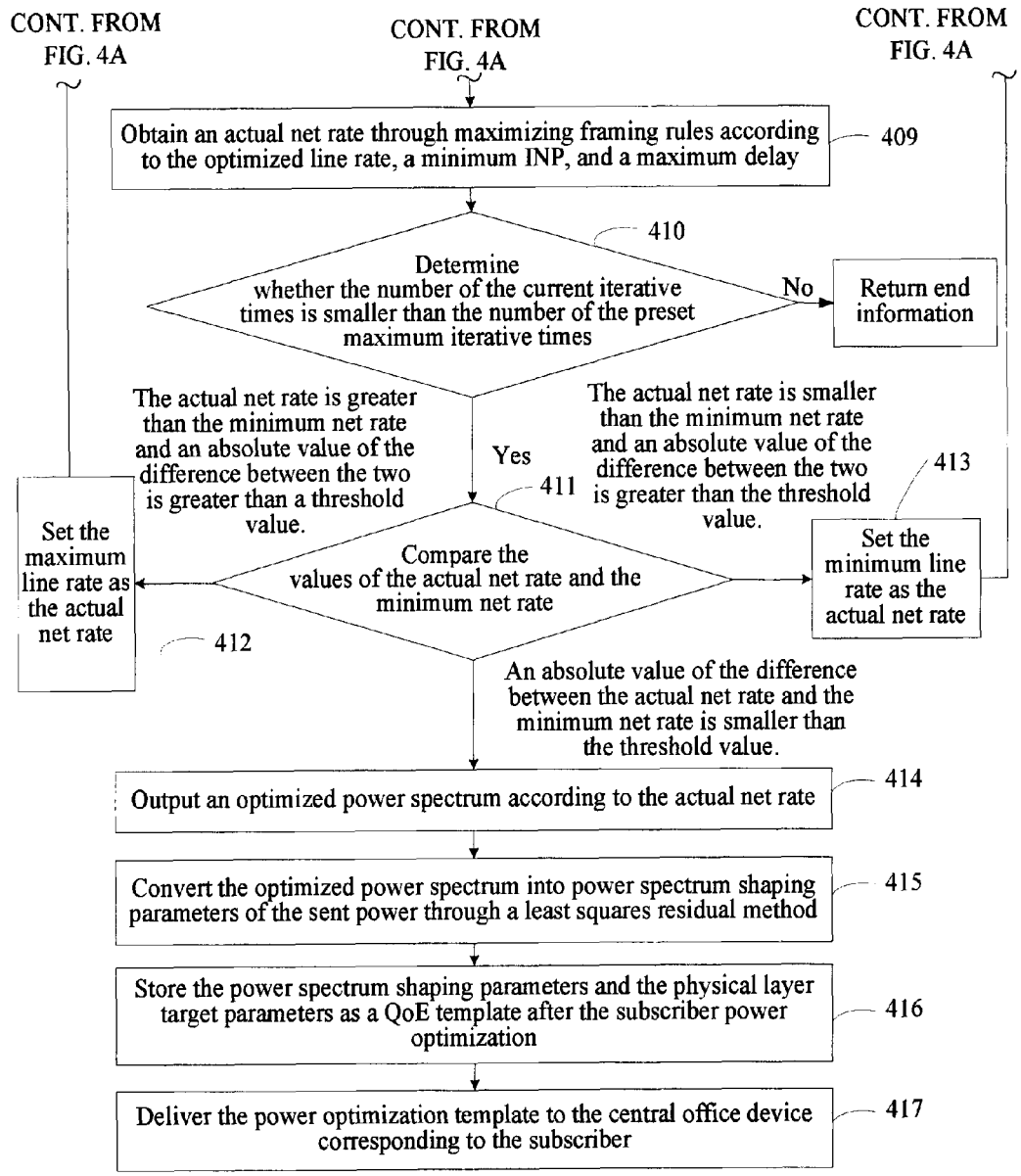

A flow of another embodiment of a method for power parameter optimization based on DSL according to the present invention is as shown in FIGS. 4A and 4B. The embodiment shows the process of obtaining an actual net rate through maximizing framing rules, obtaining an optimized power spectrum by using an iterative method, and integrating and delivering the optimized power spectrum and the physical layer target parameters.

In Step 401, service information of a subscriber delivered by an ISP at a preset time interval is received.

The ISP stores various corresponding service information of each subscriber according to service types applied by the subscriber. When the service information of the subscriber is provided to an SMC, the ISP may preset a time interval for delivery and deliver the service information of the subscriber to the corresponding SMC at the time interval.

In Step 402, a pre-stored corresponding relation between the service types and QoE parameters is searched to obtain the QoE parameters corresponding to the service information.

The SMC stores multiple QoE parameters corresponding to each type of services, and a set of QoE parameters corresponding to the service information can be searched according to the service information of the subscriber delivered by the ISP.

In Step 403, the QoE parameters that are of a same type but are of different services are compared to obtain the QoE parameter with a maximum value.

Since the same type of QoE parameters of different services are different, and these services need to be realized in a single subscriber line, the maximum value of the same type of QoE parameters of different services is determined as a final value of the QoE parameters. The purpose is to meet the demands of other services with a lower QoE requirement while the demands of the service with a highest QoE requirement are met.

In Step 404, all the QoE parameters with the maximum value are converted into physical layer target parameters according to a corresponding relation between the QoE parameters and the physical layer target parameters.

Since the QoE parameters are only IP layer parameters, and physical layer parameters are needed for running of the subscriber line, the determined QoE parameters of the subscriber need to be converted into the physical layer target parameters. The SMC pre-stores the corresponding relation between the QoE parameters and the physical layer parameters, and the QoE parameters can be converted into the physical layer target parameters according to the corresponding relation.

During the conversion, the maximum delay (MaxDelay) is directly calculated by an end-to-end network delay (E2E network MaxDelay); a minimum INP (INPmin) is determined by a jitter parameter (Jitter), a maximum error duration (MaxErrorDuration), a number of IP packet loss (Corresponding Loss Period in IP packets), and an error packet loss time interval (LossDistance); a minimum net rate (Min NetDataRate) is calculated by the obtained MaxDelay, INPmin, and an IP layer net rate (IP layer NetDataRate); and an IP packet loss rate (IPLR) and an IP bit error rate (IP BER) are converted into a target SNR margin (TargetMargin).

In Step 405, a request for obtaining line running information is sent to a central office device.

After obtaining the physical layer target parameters corresponding to the service information of the subscriber, the SMC needs to obtain the line running information to optimize the power of the running line. In this embodiment, when needing the line running information, the SMC sends a request to the central office device.

In Step 406, the line running information of the subscriber returned by the central office device according to the request is received.

The central office device obtains the line running information corresponding to the subscriber according to the request of the SMC. The information includes testing parameters (that is, background noise and channel attenuation), and also includes pre-stored line target parameters (that is, a maximum reachable rate, a maximum power, and a maximum power of each sub-band). The central office device returns the obtained line running information to the SMC.

In Step 407, a minimum line rate is initialized as a minimum net rate and a maximum line rate is initialized as a maximum reachable rate, and the number of maximum iterative times is preset.

Before the SMC performs power optimization, the parameters of the system are firstly initialized, that is, the minimum line rate is initialized as the minimum net rate of the physical layer target parameters, and the maximum line rate is initialized as the maximum reachable rate of the line target parameters. Since the power optimization process is an iterative process, the number of the maximum iterative times needs to be set to prevent the iteration from entering an infinite loop.

In Step 408, a power optimization algorithm is executed according to a target line rate, the target SNR margin, the testing parameters, and the line target parameters to obtain an optimal sent power spectrum, a minimum total power, and a corresponding optimized line rate when the target line rate is reached.

The target line rate may be set as half of a sum of the minimum line rate and the maximum line rate. It is assumed that a DSL line system has K subscribers (lines) and uses N tones (a sub-band, and the bandwidth of a tone is 4312.5 Hz) to send signals, the target line rate, the target SNR margin, the background noise, and the channel attenuation are input into Formula (4). That is, according to the Shannon channel capacity formula, the data rate of the $k^{th}$ subscriber is expressed as:

$$R_k = \sum_{n=1}^{N} b_n^k \qquad \text{Formula (4)}$$

$$= \sum_{n=1}^{N} \log_2\left(1 + \frac{H_n^{k,k} S_n^k}{\Gamma\left(\sum_{j \neq k} H_n^{k,j} S_n^j + \sigma_n^2\right)}\right)$$

In the above Formula (4), $b_n^k$ represents a bit loading of the $k^{th}$ subscriber at the $n^{th}$ tone; $\Gamma$ is the target SNR margin; N represents the number of the tones; K represents the number of the subscribers; $H_n^{k,k}$ represents the channel attenuation of the $k^{th}$ subscriber at the $n^{th}$ tone; $S_n^k$ represents an amplitude value of the sent signals of the $k^{th}$ subscriber at the $n^{th}$ tone; $S_n^j$ represents an amplitude value of the sent signals of the $j^{th}$ subscriber at the $n^{th}$ tone; $H_n^{k,j}$ represents a far-end crosstalk function of the $j^{th}$ subscriber to the $k^{th}$ subscriber at the $n^{th}$ tone; and $\sigma_n^2$ represents the background noise of the $k^{th}$ subscriber at the $n^{th}$ tone. In Formula (4), $H_n^{k,k} S_n^k$ represents the received signals of the $k^{th}$ subscriber at the $n^{th}$ tone, and $$\sum_{j \neq k} H_n^{k,j} S_n^j$$

represents the interference signals of the $k^{th}$ subscriber at the $n^{th}$ tone from other subscribers.

According to the above Formula (4), the DSM optimization of minimizing the power may be expressed as:

$$\min \sum_{k=1}^{K} \sum_{n=1}^{N} S_n^k \qquad \text{Formula (5)}$$

$$\text{s.t.} R_k \geq R_k^{target}, k = 1, 2, \ldots, K.$$

$$\sum_{n=1}^{N} S_n^k \leq P_k, k = 1, 2, \ldots, K.$$

$$0 \leq S_n^k \leq S_n^{k,max}, k = 1, \ldots, K, n = 1, \ldots, N.$$

In Formula (5), a first constraint condition indicates that all subscribers have to reach respective target line rates; a second constraint condition indicates that all subscribers need to meet a power constraint $$\sum_{n=1}^{N} S_n^k \leq P_k,$$

where $P_k$ represents a maximum total power that can be sent by the subscriber k; and a third constraint condition indicates that the maximum power that can be sent by each tone of each subscriber may not exceed $S_n^{k,max}$. Formula (5) turns to dual optimization by using a Lagrangian multiplier method:

$$\min_{s_1, \ldots, s_K} J = \sum_{n=1}^{N} \sum_{k=1}^{K} [(1 + \lambda_k) s_n^k - w_k b_n^k] \qquad \text{Formula (6)}$$

The optimization objective function of each tone is defined as:

$$J_k = \sum_{k=1}^{K} [(1 + \lambda_k) s_n^k - w_k b_n^k]. \qquad \text{Formula (7)}$$

As can be known from Formula (4), $$b_n^k = \log_2\left(1 + \frac{H_n^{k,k} s_n^k}{\Gamma\left(\sum_{j \neq k} H_n^{k,j} s_n^j + \sigma_n^2\right)}\right)$$

The $w_k$, $\lambda_k$ in Formula (7) is a Lagrange multiplier factor, which is an undetermined constant. As such, the power minimization may be analyzed into individual dual sub-optimization min $J_k$. Firstly, the $w_k$, $\lambda_k$ is iteratively searched, a combination of the sent power that minimizes the target function $J_k$ is found for each tone to find an optimal solution of the optimization (5). when the target line rate is reached under the condition that iteration times are not beyond the maximum number, the optimal sent power spectrum, the minimum total power, and the corresponding optimized line rate can be output.

In Step 409, the actual net rate is obtained through maximizing framing rules according to the optimized line rate, the minimum NP, and the maximum delay.

The optimized line rate is converted into the actual net rate according to the relation between the maximizing framing rules of the line rate and the minimum INP, the maximum delay, and the line rate in the standard G993.2.

In Step 410, it is determined whether the number of the current iterative times is smaller than the number of the preset maximum iterative times, and if yes, Step 411 is performed; otherwise, end information is returned.

In Step 411, the values of the actual net rate and the minimum net rate are compared. If the actual net rate is greater than the minimum net rate and an absolute value of the difference is greater than a preset threshold value, Step 412 is performed; if the actual net rate is smaller than the minimum net rate and the absolute value of the difference is greater than the preset threshold value, Step 413 is performed; and if the absolute value of the difference between the actual net rate and the minimum net rate is smaller than the preset threshold value, Step 414 is performed.

In Step 412, the maximum line rate is set as the actual net rate, and the process returns to Step 407.

In Step 413, the minimum line rate is set as the actual net rate, and the process returns to Step 407.

In Step 414, the optimized power spectrum is output according to the actual net rate.

In Step 415, the optimized power spectrum is converted into power spectrum shaping parameters of the sent power through a least squares residual method.

In Step 416, the power spectrum shaping parameters and the physical layer target parameters are stored as a QoE template after the subscriber power optimization.

In Step 417, the power optimization template is delivered to the central office device corresponding to the subscriber, and the current flow is completed.

The SMC delivers the power optimization template to an MIB of the central office device via a management entity of the central office device. When the line is activated, a sending unit xTU-C of the central office device and a sending unit xTU-R of the user end device execute these parameter configurations, and the power optimization becomes effective.

Figure 5A:
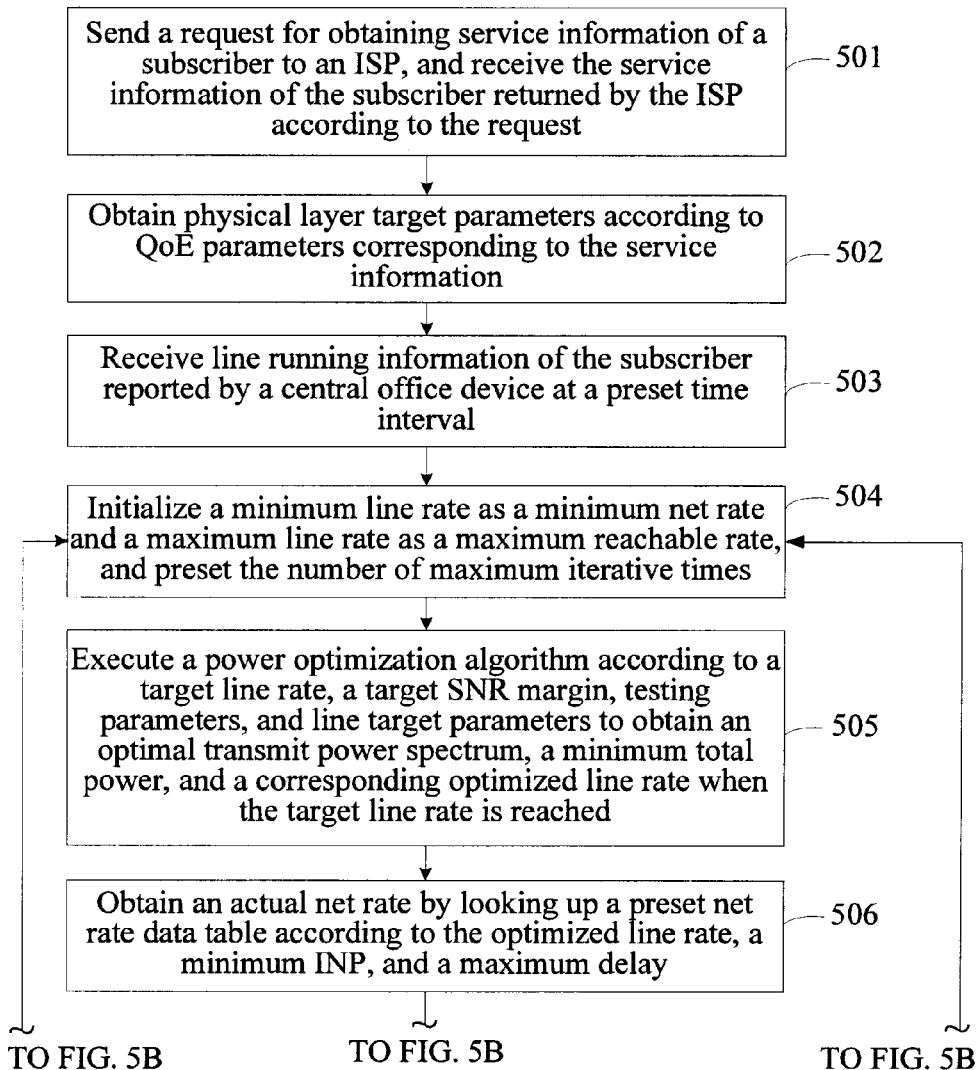
FIGS. 5A and 5B are a flow chart of another embodiment of a method for power optimization based on DSL according to the present invention.
Figure 5B:
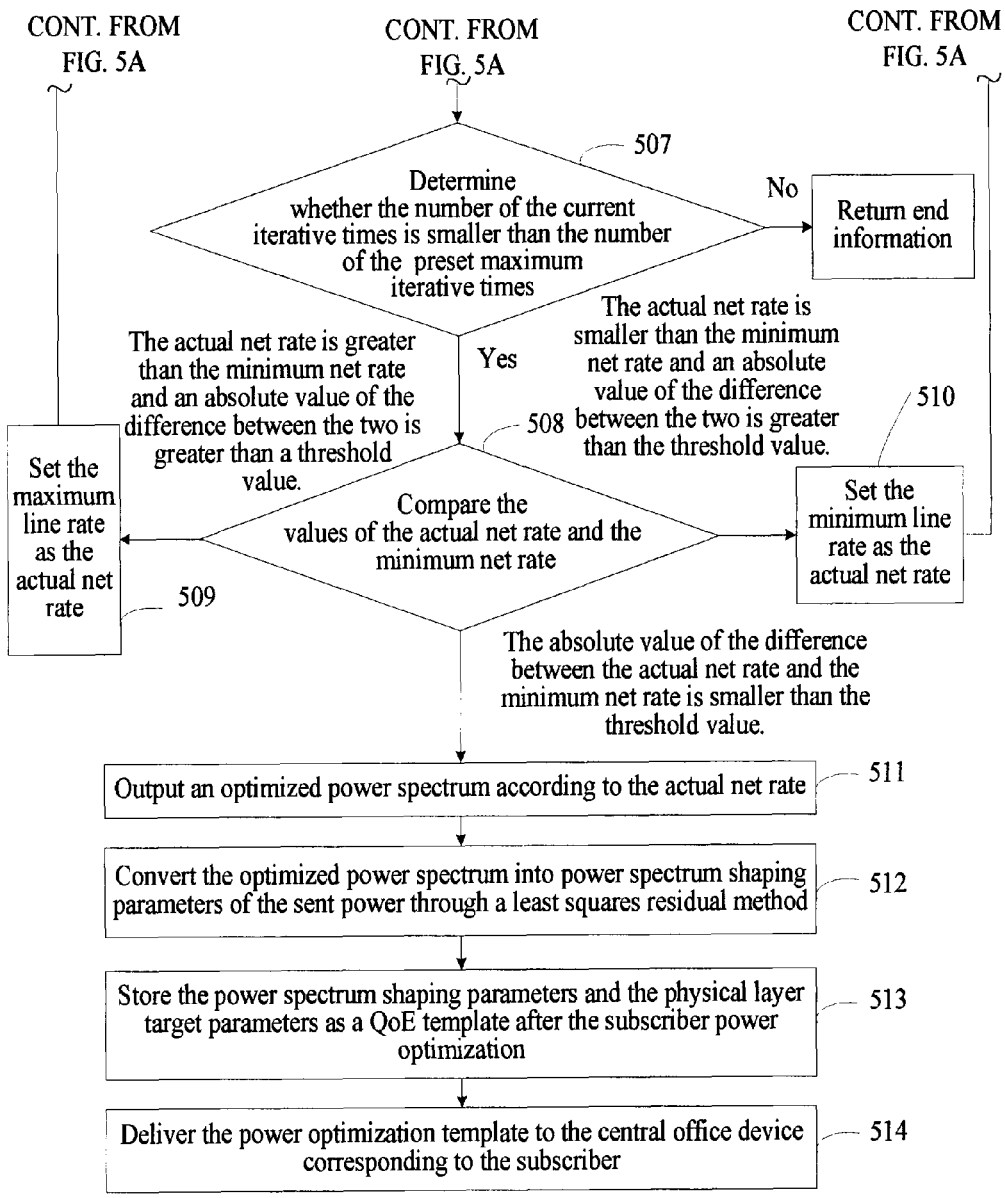

A flow of another embodiment of a method for power optimization based on DSL according to the present invention is as shown in FIGS. 5A and 5B. The embodiment shows a process of obtaining the actual net rate by using a table look-up method, obtaining the optimized power spectrum by using an iterative method, and integrating and delivering the optimized power spectrum and the physical layer target parameters.

In Step 501, a request for obtaining service information of a subscriber is sent to an ISP, and the service information of the subscriber returned by the ISP according to the request is received.

In Step 502, physical layer target parameters are obtained according to QoE parameters corresponding to the service information.

In Step 503, line running information of the subscriber reported by a central office device at the preset time interval is received.

In Step 504, a minimum line rate is initialized as a minimum net rate and a maximum line rate is initialized as a maximum reachable rate, and the number of maximum iterative times is preset.

In Step 505, a power optimization algorithm is executed according to a target line rate, a target SNR margin, testing parameters, and line target parameters to obtain an optimal sent power spectrum, a minimum total power, and a corresponding optimized line rate when the target line rate is reached.

The power optimization algorithm of this embodiment is identical to the embodiment shown in FIGS. 4A and 4B, so the details thereof will not be described herein again.

In Step 506, an actual net rate is obtained by looking up a preset net rate data table according to the optimized line rate, the minimum INP, and the maximum delay.

Different from the embodiment shown in FIGS. 4A and 4B, in this embodiment, the SMC pre-stores the net rate data table obtained on the basis of the line rate, the minimum INP, and the maximum delay, so that, according to the relation between the three parameters, the actual net rate corresponding to the optimized line rate can be obtained by looking up the table.

In Step 507, it is determined whether the number of the current iterative times is smaller than the number of the preset maximum iterative times, and if yes, Step 508 is performed; otherwise, end information is returned.

In Step 508, the values of the actual net rate and the minimum net rate are compared. If the actual net rate is greater than the minimum net rate and an absolute value of the difference between the two is greater than a preset threshold value, Step 509 is performed; if the actual net rate is smaller than the minimum net rate and an absolute value of the difference between the two is greater than the preset threshold value, Step 510 is performed; and if an absolute value of the difference between the actual net rate and the minimum net rate is smaller than the preset threshold value, Step 511 is performed.

In Step 509, the maximum line rate is set as the actual net rate, and the process returns to Step 504.

In Step 510, the minimum line rate is set as the actual net rate, and the process returns to Step 504.

In Step 511, the optimized power spectrum is output according to the actual net rate.

In Step 512, the optimized power spectrum is converted into power spectrum shaping parameters of the sent power through a least squares residual method.

In Step 513, the power spectrum shaping parameters and the physical layer target parameters are stored as a QoE template after the subscriber power optimization.

In Step 514, the power optimization template is delivered to the central office device corresponding to the subscriber, and the current flow is completed.

Figure 6:
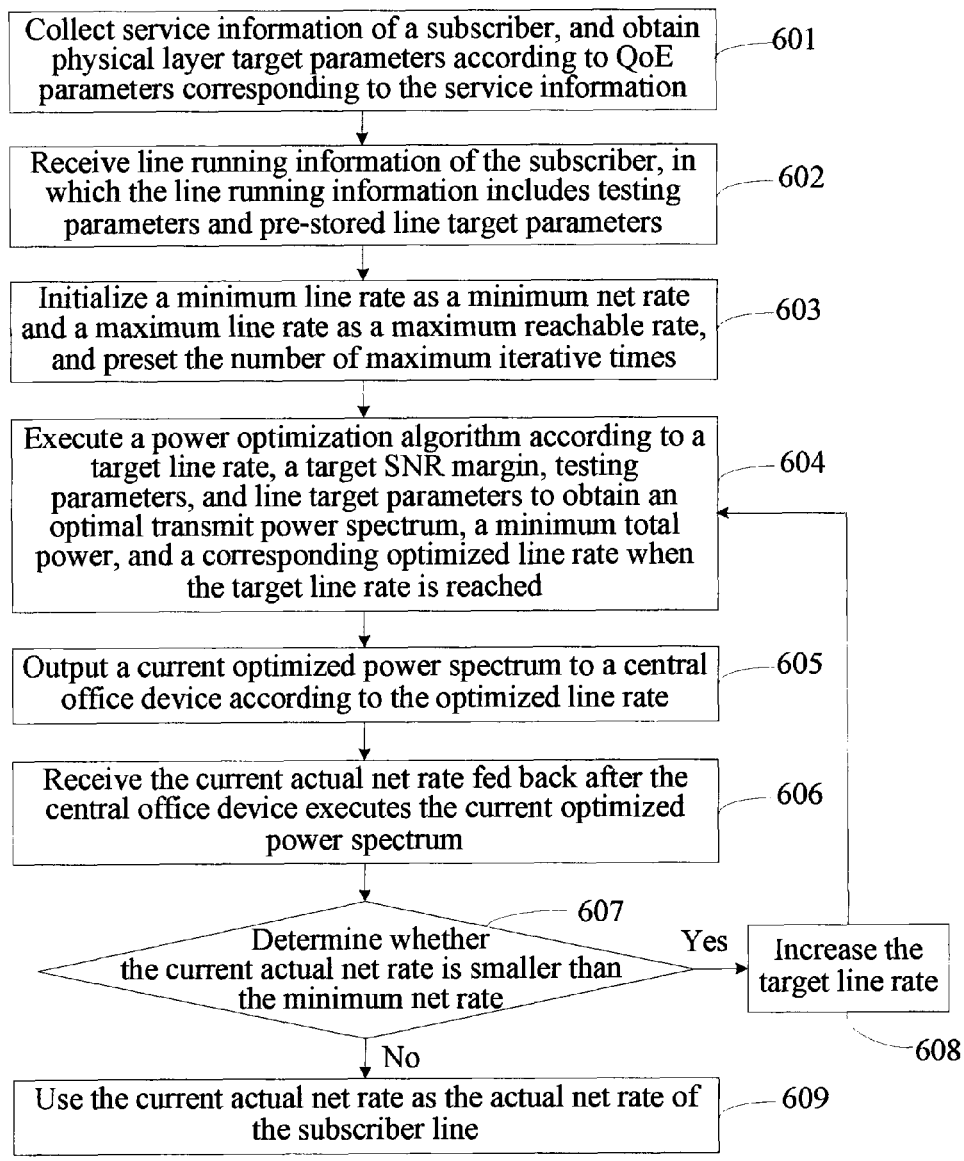
FIG. 6 is a flow chart of another embodiment of a method for power optimization based on DSL according to the present invention.

A flow of another embodiment of a method for power optimization based on DSL according to the present invention is as shown in FIG. 6. The embodiment shows a process of iteration according to the current actual net rate that is fed back after the optimized power spectrum is output.

In Step 601, service information of a subscriber is collected, and physical layer target parameters are obtained according to QoE parameters corresponding to the service information.

In Step 602, line running information of the subscriber is received, and the line running information includes testing parameters and pre-stored line target parameters.

In Step 603, a target line rate is initialized as a minimum net rate.

In Step 604, a power optimization algorithm is executed according to the target line rate, the target SNR margin, the testing parameters, and the line target parameters to obtain an optimal sent power spectrum, a minimum total power, and a corresponding optimized line rate when the target line rate is reached.

The power optimization algorithm of this embodiment is identical to the embodiment shown in FIGS. 4A and 4B, so the details thereof will not be described herein again.

In Step 605, the current optimized power spectrum is output to the central office device according to the optimized line rate.

Different from the embodiments of FIGS. 4A and 4B and FIGS. 5A and 5B, in this embodiment, the obtained optimized line rate and the generated current optimized power spectrum via iteration are delivered to the central office device, and the central device executes the corresponding parameter configurations according to the current optimized power spectrum.

In Step 606, the current actual net rate fed back after the central office device executes the current optimized power spectrum is received.

After the central office device executes the current parameter configurations, the current actual net rate is obtained according to the execution results. The current actual net rate is fed back to the SMC, and the SMC further determines whether the current actual net rate meets the QoE requirements.

In Step 607, it is determined whether the current actual net rate is smaller than the minimum net rate, and if yes, Step 608 is performed; otherwise, Step 609 is performed.

In Step 608, the target line rate is increased, and the process returns to Step 604.

When the target line rate is increased, a new target line rate can be obtained by the following method. Specifically, a difference between the minimum net rate and the current actual net rate is obtained, the difference is added to the original target line rate to obtain the new target line rate, then the new target line rate is used as the output parameter of the power optimization algorithm, and Step 604 is performed.

If the current actual net rate is smaller than the minimum net rate, it indicates that the parameter configurations currently executed by the central office device do not meet the QoE requirements, and a power minimization algorithm and a process of further optimization according to the actual net rate returned by the central office device need to be executed again.

In Step 609, the current actual net rate is used as the actual net rate of the subscriber line, and the flow is completed.

If the current actual net rate is greater than the minimum net rate, it indicates that the parameter configurations currently executed by the central office device meet the QoE requirements, and the current actual net rate is used as the actual net rate of the subscriber line.

The embodiments of the method for power optimization based on DSL are corresponding to each other. A system for power optimization based on DSL is further provided in the present invention.

Figure 7:
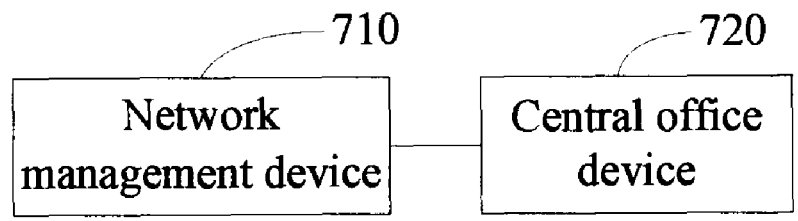
FIG. 7 is a schematic structural view of an embodiment of a system for power optimization based on DSL according to the present invention.

A schematic structural view of an embodiment of a system for power optimization based on DSL according to the present invention is as shown in FIG. 7, and the system includes a network management device 710 and a central office device 720.

The network management device 710 is adapted to collect service information of a subscriber, obtain physical layer target parameters according to QoE parameters corresponding to the service information, receive line running information of the subscriber reported by the central office device 720, in which the line running information includes testing parameters and pre-stored line target parameters, use the physical layer target parameters and the line running information as input parameters of a power optimization algorithm, and obtain an optimized power spectrum through the power optimization algorithm.

Moreover, the network management device is further adapted to convert the optimized power spectrum into power spectrum shaping parameters of the sent power through a least squares residual method, store the power spectrum shaping parameters and the physical layer target parameters and use the two as a power optimization template of the subscriber, and deliver the power optimization template to the central office device 720 corresponding to the subscriber.

Corresponding to the method and system for power optimization based on DSL, the present invention further provides embodiments of a device for power optimization based on DSL.

Figure 8:
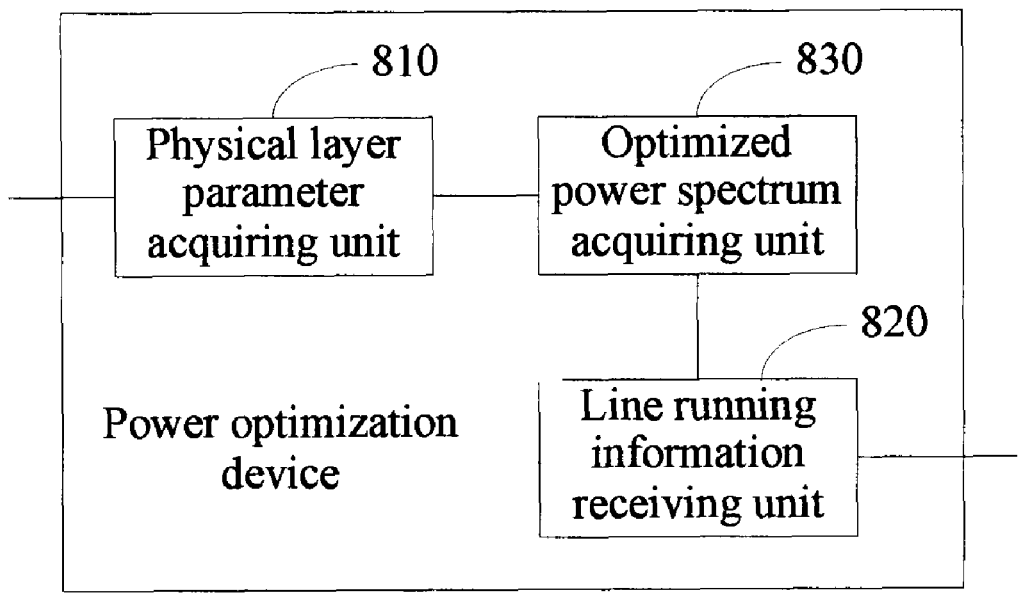
FIG. 8 is a schematic structural view of an embodiment of a device for power optimization based on DSL according to the present invention.

A schematic structural view of an embodiment of a device for power optimization based on DSL according to the present invention is as shown in FIG. 8, and the device includes a physical layer parameter acquiring unit 810, a line running information receiving unit 820, and an optimized power spectrum acquiring unit 830.

The physical layer parameter acquiring unit 810 is adapted to collect service information of a subscriber, and obtain physical layer target parameters according to QoE parameters corresponding to the service information. The line running information receiving unit 820 is adapted to receive line running information of the subscriber, in which the line running information includes testing parameters and pre-stored line target parameters. The optimized power spectrum acquiring unit 830 is adapted to use the physical layer target parameters and the line running information as input parameters of a power optimization algorithm, and obtain an optimized power spectrum through the power optimization algorithm.

Figure 9:
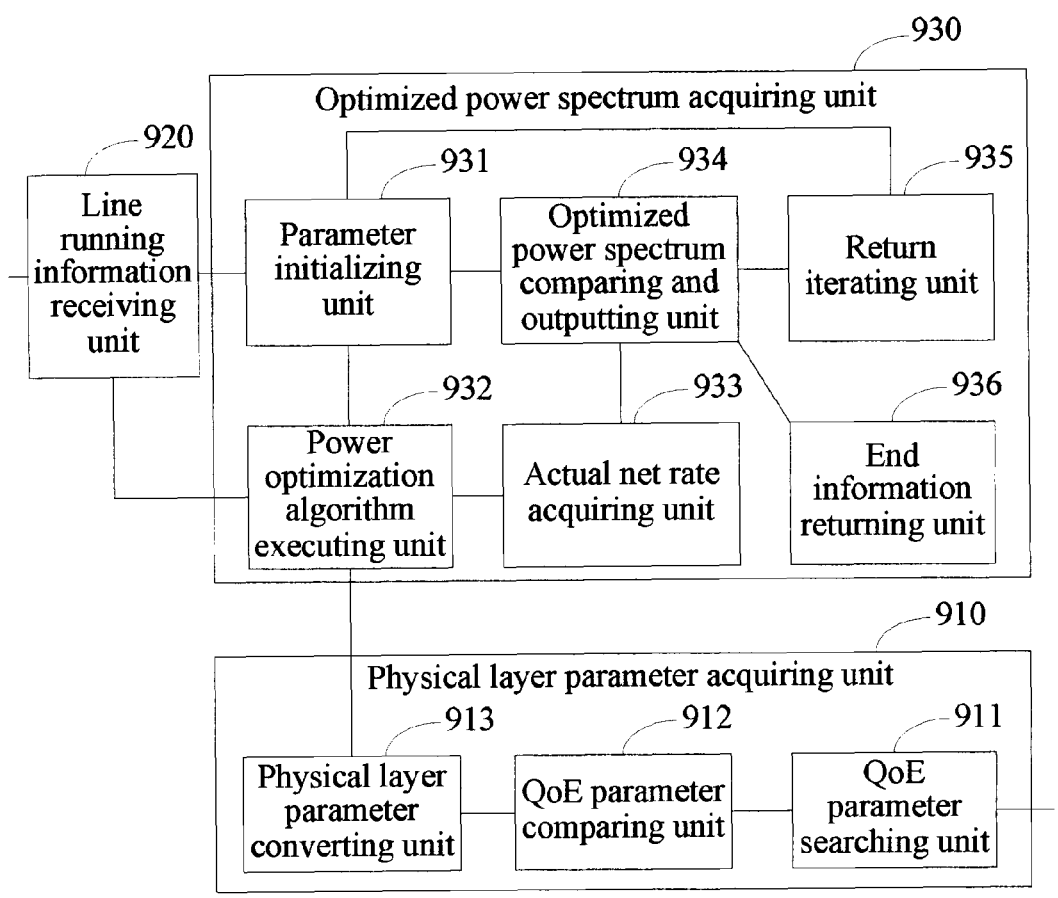
FIG. 9 is a schematic structural view of another embodiment of a device for power optimization based on DSL according to the present invention.

A schematic structural view of another embodiment of a device for power optimization based on DSL according to the present invention is as shown in FIG. 9, and the device includes a physical layer parameter acquiring unit 910, a line running information receiving unit 920, and an optimized power spectrum acquiring unit 930.

The physical layer parameter acquiring unit 910 is adapted to collect service information of a subscriber, and obtain physical layer target parameters according to QoE parameters corresponding to the service information. When the service information of the subscriber is collected, the service information of the subscriber delivered at a preset time interval is received; or a request for obtaining the service information of the subscriber is sent, and the service information of the subscriber returned according to the request is received. Specifically, the physical layer parameter acquiring unit 910 includes a QoE parameter searching unit 911, a QoE parameter comparing unit 912, and a physical layer parameter converting unit 913.

The QoE parameter searching unit 911 is adapted to search for a pre-stored corresponding relation between service types and the QoE parameters to obtain the QoE parameters corresponding to the service information.

The QoE parameter comparing unit 912 is adapted to compare the QoE parameters that are of a same type but are of different services to obtain the QoE parameter with a maximum value.

The physical layer parameter converting unit 913 is adapted to convert the QoE parameter with the maximum value into the physical layer target parameters according to the corresponding relation between the QoE parameters and the physical layer target parameters.

The line running information receiving unit 920 is adapted to receive line running information of the subscriber, in which the line running information includes testing parameters and pre-stored line target parameters. When the line running information of the subscriber is collected, the line running information of the subscriber reported by the central office device at a preset time interval is received; or a request for obtaining the line running information is sent to the central office device, and the line running information of the subscriber returned by the central office device is received.

The optimized power spectrum acquiring unit 930 includes a parameter initializing unit 931, a power optimization algorithm executing unit 932, an actual net rate acquiring unit 933, an optimized power spectrum comparing and outputting unit 934, a return iterating unit 935, and an end information returning unit 936.

The parameter initializing unit 931 is adapted to initialize the minimum line rate as a minimum net rate and the maximum line rate as a maximum reachable rate, and preset the number of maximum iterative times.

The power optimization algorithm executing unit 932 is adapted to execute the power optimization algorithm according to a target line rate, a target SNR margin, the testing parameters, and the line target parameters to obtain a minimum total power and a corresponding optimized line rate when the target line rate is reached. The target line rate is obtained according to the minimum net rate and the maximum line rate.

The actual net rate acquiring unit 933 is adapted to obtain an actual net rate through maximizing framing rules according to the optimized line rate, a minimum INP, and a maximum delay; or obtain an actual net rate by looking up a preset net rate data table according to the optimized line rate, a minimum INP, and a maximum delay.

The optimized power spectrum comparing and outputting unit 934 is adapted to compare the actual net rate with the minimum net rate, and output the optimized power spectrum according to the actual net rate, when an absolute value of a difference between the two is smaller than a preset threshold value and the number of the current iterative times is smaller than the number of the maximum iterative times.

The return iterating unit 935 is adapted to set the maximum line rate as the actual net rate and return the actual net rate to the parameter initializing unit when the actual net rate is greater than the minimum net rate, the absolute value of the difference between the two is greater than the preset threshold value, and the number of the current iterative times is smaller than the number of the maximum iterative times; or set the minimum line rate as the actual net rate and return the actual net rate to the parameter initializing unit when the actual net rate is smaller than the minimum net rate, the absolute value of the difference between the two is greater than the preset threshold value, and the number of the current iterative times is smaller than the number of the maximum iterative times.

The end information returning unit 936 is adapted to return end information when the number of the current iterative times is greater than the number of the maximum iterative times.

Figure 10:
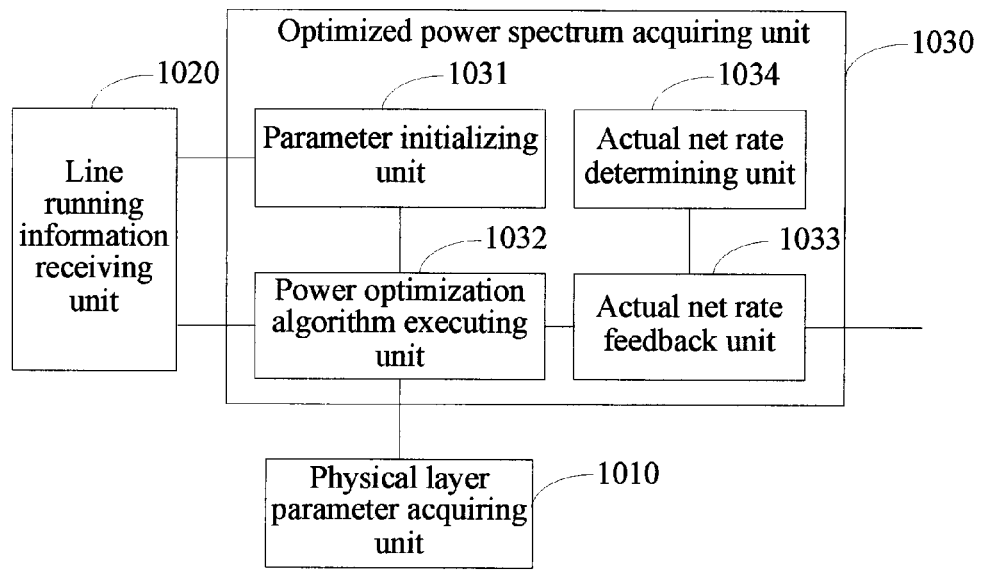
FIG. 10 is a schematic structural view of another embodiment of a device for power optimization based on DSL according to the present invention.

A schematic structural view of another embodiment of a device for power optimization based on DSL according to the present invention is as shown in FIG. 10, and the device includes a physical layer parameter acquiring unit 1010, a line running information receiving unit 1020, and an optimized power spectrum acquiring unit 1030.

The physical layer parameter acquiring unit 1010 is adapted to collect service information of a subscriber, and obtain physical layer target parameters according to QoE parameters corresponding to the service information. When the service information of the subscriber is collected, the service information of the subscriber delivered at a preset time interval is received; or a request for obtaining the service information of the subscriber is sent, and the service information of the subscriber returned according to the request is received.

The line running information receiving unit 1020 is adapted to receive line running information of the subscriber, in which the line running information includes testing parameters and pre-stored line target parameters. When the line running information of the subscriber is collected, the line running information of the subscriber reported by a central office device at a preset time interval is received; or a request for obtaining the line running information is sent to the central office device, and the line running information of the subscriber returned by the central office device is received.

The optimized power spectrum acquiring unit 1030 includes a parameter initializing unit 1031, a power optimization algorithm executing unit 1032, an actual net rate feedback unit 1033, and an actual net rate determining unit 1034.

The parameter initializing unit 1031 is adapted to initialize a target line rate as a minimum net rate.

The power optimization algorithm executing unit 1032 is adapted to execute a power optimization algorithm according to the target line rate, the target SNR margin, the testing parameters, and the line target parameters to obtain a minimum total power and a corresponding optimized line rate when the target line rate is reached.

The actual net rate feedback unit 1033 is adapted to output a current optimized power spectrum according to the optimized line rate, and receive the current actual net rate fed back after the current optimized power spectrum is executed.

The actual net rate determining unit 1034 is adapted to determine whether the current actual net rate is smaller than the minimum net rate, and if yes, increase the target line rate and return to the step of executing the power optimization algorithm; otherwise, use the current actual net rate as the actual net rate of the subscriber line.

Figure 11:
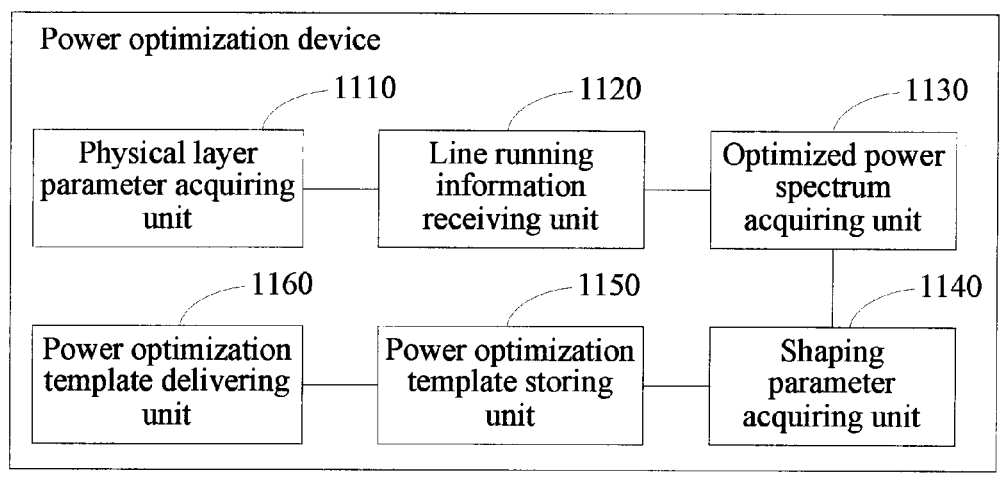
FIG. 11 is a schematic structural view of another embodiment of a device for power optimization based on DSL according to the present invention.

A block diagram of another embodiment of a device for power optimization based on DSL according to the present invention is as shown in FIG. 11, and the device includes a physical layer parameter acquiring unit 1110, a line running information receiving unit 1120, an optimized power spectrum acquiring unit 1130, a shaping parameter acquiring unit 1140, a power optimization template storing unit 1150, and a power optimization template delivering unit 1160.

The physical layer parameter acquiring unit 1110 is adapted to collect service information of a subscriber, and obtain physical layer target parameters according to QoE parameters corresponding to the service information. The line running information receiving unit 1120 is adapted to receive line running information of the subscriber, in which the line running information includes testing parameters and pre-stored line target parameters. The optimized power spectrum acquiring unit 1130 is adapted to use the physical layer target parameters and the line running information as input parameters of a power optimization algorithm, and obtain an optimized power spectrum through the power optimization algorithm. The shaping parameter acquiring unit 1140 is adapted to convert the optimized power spectrum into power spectrum shaping parameters of the sent power through a least squares residual method. The power optimization template storing unit 1150 is adapted to store the power spectrum shaping parameters and the physical layer target parameters, and use the two as a power optimization template of the subscriber. The power optimization template delivering unit 1160 is adapted to deliver the power optimization template to a central office device corresponding to the subscriber.

It can be known from the description of the embodiments of the present invention that, when the embodiments of the present invention are applied to optimize the DSL parameters, since the power in the DSL network is optimized according to the QoE, the subscriber's experience is improved. Moreover, the least power method is adopted to optimize the transmit power spectrum, and the total power consumption and crosstalk between different DSL signals are reduced while meeting the QoE, so that the signal transmission of the system is stable, and the service transmission quality is improved.

Person having ordinary skill in the art may understand that all or part of the steps of the method according to the embodiments of the present invention may be implemented by a program instructing relevant hardware. The program may be stored in a computer readable storage medium. When the process is executed, the following steps are included. The service information of the subscriber is collected, and physical layer target parameters are obtained according to QoE parameters corresponding to the service information. The line running information of the subscriber is received, and the line running information includes the testing parameters and the pre-stored line target parameters. The physical layer target parameters and the line running information are used as input parameters of a power optimization algorithm, and an optimized power spectrum is obtained through the power optimization algorithm. The storage medium includes ROM/RAM, diskette, optical disk, and so on.

Although the invention has been described through some exemplary embodiments, the invention is not limited to such embodiments. It is apparent that those skilled in the art can make various modifications and variations to the invention without departing from the spirit and scope of the present invention. The appended claims of the present invention are intended to cover those modifications and variations.

The invention claimed is:

1. A method for power optimization based on Digital Subscriber Line (DSL), comprising:
   collecting service information of a subscriber, and obtaining physical layer target parameters according to Quality of Experience (QoE) parameters corresponding to the service information;
   receiving line running information of the subscriber; and
   using the physical layer target parameters and the line running information as input parameters of a power optimization algorithm, and obtaining an optimized power spectrum through the power optimization algorithm;
   wherein the physical layer target parameters comprise: one of or any combination of a minimum net rate, a minimum impulse noise protection (INP), a maximum delay, and a target signal-to-noise ratio (SNR) margin.

2. The method according to claim 1, wherein the obtaining the physical layer target parameters according to the QoE parameters corresponding to the service information comprises:
   searching for a pre-stored corresponding relation between service types and the QoE parameters to obtain the QoE parameters corresponding to the service information;
   comparing the QoE parameters that are of a same type but are of different services in the service information to obtain the QoE parameter with a maximum value; and
   converting the QoE parameter with the maximum value into the physical layer target parameters according to a corresponding relation between the QoE parameters and the physical layer target parameters.

3. The method according to claim 1, wherein
   the line running information comprises: testing parameters and pre-stored line target parameters.

4. The method according to claim 3, wherein
   the testing parameters comprise: background noise and channel attenuation; and
   the pre-stored line target parameters comprise: a maximum reachable rate, a maximum power, and a maximum power of each sub-band.

5. The method according to claim 4, wherein the obtaining the optimized power spectrum through the power optimization algorithm comprises:
   initializing a minimum line rate as the minimum net rate and a maximum line rate as the maximum reachable rate, and presetting a number of maximum iterative times;
   executing the power optimization algorithm according to a target line rate, the target SNR margin, the testing parameters, and the line target parameters to obtain an optimized line rate when the target line rate is reached, wherein the target line rate is obtained according to the minimum line rate and the maximum line rate;
   obtaining an actual net rate through maximizing framing rules according to the optimized line rate, the minimum INP, and the maximum delay; and
   comparing the actual net rate with the minimum net rate, and when an absolute value of a difference between the two is smaller than a preset threshold value and a number of a current iterative times is smaller than the number of the maximum iterative times, outputting the optimized power spectrum according to the actual net rate.

6. The method according to claim 4, wherein the obtaining the optimized power spectrum through the power optimization algorithm comprises:
   initializing a minimum line rate as the minimum net rate and a maximum line rate as the maximum reachable rate, and presetting a number of maximum iterative times;
   executing the power optimization algorithm according to a target line rate, the target SNR margin, the testing parameters, and the line target parameters to obtain an optimized line rate when the target line rate is reached, wherein the target line rate is obtained according to the minimum line rate and the maximum line rate;
   obtaining an actual net rate by looking up a preset net rate data table according to the optimized line rate, the minimum INP, and the maximum delay; and
   comparing the actual net rate with the minimum net rate, and when an absolute value of a difference between the two is smaller than a preset threshold value and a number of a current iterative times is smaller than the number of the maximum iterative times, outputting the optimized power spectrum according to the actual net rate.

7. The method according to claim 5, further comprising:
   setting the maximum line rate as the actual net rate and returning to a step of initialization when the actual net rate is greater than the minimum net rate, wherein the absolute value of the difference between the two is greater than the preset threshold value, and the number of the current iterative times is smaller than the number of the maximum iterative times;
   setting the minimum line rate as the actual net rate and returning to the step of initialization when the actual net rate is smaller than the minimum net rate, wherein the absolute value of the difference between the two is greater than the preset threshold value, and the number of the current iterative times is smaller than the number of the maximum iterative times; and
   returning end information when the number of the current iterative times is greater than the number of the maximum iterative times.

8. The method according to claim 6, further comprising:
   setting the maximum line rate as the actual net rate and returning to a step of initialization when the actual net rate is greater than the minimum net rate, wherein the absolute value of the difference between the two is greater than the preset threshold value, and the number of the current iterative times is smaller than the number of the maximum iterative times;
   setting the minimum line rate as the actual net rate and returning to the step of initialization when the actual net rate is smaller than the minimum net rate, wherein the absolute value of the difference between the two is greater than the preset threshold value, and the number of the current iterative times is smaller than the number of the maximum iterative times; and
   returning end information when the number of the current iterative times is greater than the number of the maximum iterative times.

9. The method according to claim 4, wherein the obtaining the optimized power spectrum through the power optimization algorithm comprises:
   initializing a target line rate as the minimum net rate;
   executing the power optimization algorithm according to the target line rate, the target SNR margin, the testing parameters, and the line target parameters to obtain an optimized line rate when the target line rate is reached;

outputting a current optimized power spectrum according to the optimized line rate, and receiving a current actual net rate fed back after the current optimized power spectrum is executed; and determining whether the current actual net rate is smaller than the minimum net rate, and if yes, increasing the target line rate and returning to the step of executing the power optimization algorithm; otherwise, using the current actual net rate as an actual net rate of a subscriber line.

10. The method according to claim 1, further comprising:
converting the optimized power spectrum into power spectrum shaping parameters of sent power through a least squares residual method;
storing the power spectrum shaping parameters and the physical layer target parameters, and using the two as a power optimization template of the subscriber; and
delivering the power optimization template to a central office device corresponding to the subscriber.

11. A system for power optimization based on Digital Subscriber Line (DSL), comprising a network management device and a central office device, wherein
the network management device is adapted to collect service information of a subscriber, obtain physical layer target parameters according to Quality of Experience (QoE) parameters corresponding to the service information, receive line running information of the subscriber reported by the central office device, use the physical layer target parameters and the line running information as input parameters of a power optimization algorithm, and obtain an optimized power spectrum through the power optimization algorithm;
wherein the physical layer target parameters comprise: one of or any combination of a minimum net rate, a minimum impulse noise protection (INP), a maximum delay, and a target signal-to-noise ratio (SNR) margin.

12. The system according to claim 11, wherein the network management device is further adapted to convert the optimized power spectrum into power spectrum shaping parameters of sent power through a least squares residual method, store the power spectrum shaping parameters and the physical layer target parameters and use the two as a power optimization template of the subscriber, and deliver the power optimization template to the central office device corresponding to the subscriber.

13. A device for power optimization based on Digital Subscriber Line (DSL), comprising:
a physical layer parameter acquiring unit, adapted to collect service information of a subscriber, and obtain physical layer target parameters according to Quality of Experience (QoE) parameters corresponding to the service information;
a line running information receiving unit, adapted to receive a line running information of the subscriber; and
an optimized power spectrum acquiring unit, adapted to use the physical layer target parameters and the line running information as input parameters of a power optimization algorithm, and obtain an optimized power spectrum through the power optimization algorithm;
wherein the physical layer target parameters comprise: one of or any combination of a minimum net rate, a minimum impulse noise protection (INP), a maximum delay, and a target signal-to-noise ratio (SNR) margin.

14. The device according to claim 13, wherein the physical layer parameter acquiring unit comprises:
a QoE parameter searching unit, adapted to search for a pre-stored corresponding relation between service types and QoE parameters to obtain the QoE parameters corresponding to the service information;
a QoE parameter comparing unit, adapted to compare the QoE parameters that are of a same type but are of different services in the service information to obtain the QoE parameter with a maximum value; and
a physical layer parameter converting unit, adapted to convert the QoE parameter with the maximum value into the physical layer target parameters according to a corresponding relation between the QoE parameters and the physical layer target parameters.

15. The device according to claim 13, further comprising:
a shaping parameter acquiring unit, adapted to convert the optimized power spectrum into power spectrum shaping parameters of sent power through a least squares residual method;
a power optimization template storing unit, adapted to store the power spectrum shaping parameters and the physical layer target parameters and use the two as a power optimization template of the subscriber; and
a power optimization template delivering unit, adapted to deliver the power optimization template to a central office device corresponding to the subscriber.

* * * * *